United States Patent
Anghelescu et al.

(10) Patent No.: US 9,851,451 B2
(45) Date of Patent: Dec. 26, 2017

(54) METHOD FOR USING GEOGRAPHICAL POSITIONING SYSTEM DATA TO SKETCH THE SITE FOR SCOUTING JOB

(71) Applicant: Landmark Graphics Corporation, Houston, TX (US)

(72) Inventors: Florin Mugur Anghelescu, Calgary (CA); David Crawshay, Katy, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 87 days.

(21) Appl. No.: 14/894,316

(22) PCT Filed: Oct. 23, 2013

(86) PCT No.: PCT/US2013/066428
§ 371 (c)(1),
(2) Date: Nov. 25, 2015

(87) PCT Pub. No.: WO2015/034541
PCT Pub. Date: Mar. 12, 2015

(65) Prior Publication Data
US 2016/0187490 A1     Jun. 30, 2016

Related U.S. Application Data

(60) Provisional application No. 61/874,749, filed on Sep. 6, 2013.

(51) Int. Cl.
*G01C 21/28* (2006.01)
*G01S 19/51* (2010.01)
*G01C 21/20* (2006.01)

(52) U.S. Cl.
CPC .............. *G01S 19/51* (2013.01); *G01C 21/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,731,997 A | * | 3/1998 | Manson | G01C 15/00 455/12.1 |
| 5,838,277 A | * | 11/1998 | Loomis | G01S 19/14 342/357.52 |

(Continued)

OTHER PUBLICATIONS

International Search Report, Apr. 28, 2014, 3 pages, International Application Division of Korean Intellectual Property Office.

*Primary Examiner* — Adam Tissot
*Assistant Examiner* — Richard Goldman

(57) ABSTRACT

The disclosed embodiments include a method, apparatus, and computer program product for identifying locations associated with a well site. For example, one disclosed embodiment includes a system that includes at least one processor, a global positioning system unit configured to receive satellite signals, and at least one memory coupled to the at least one processor and storing instructions that when executed by the at least one processor performs operations that include determining location data based on the satellite signals and indicating a location of interest associated with a well site on a map based on the location data. Certain of the disclosed embodiments may include a manual and/or an automatic tracking option for determining the location of interest associated with the well site. Non-limiting examples of locations of interest associated with a well site include a well site's perimeter, an access road to the well-site, and locations of well-site equipment.

20 Claims, 5 Drawing Sheets

(56) References Cited

U.S. PATENT DOCUMENTS

| | | | | |
|---|---|---|---|---|
| 5,929,807 A * | 7/1999 | Viney | G01C 15/00 342/357.32 |
| 6,067,046 A * | 5/2000 | Nichols | G01C 15/00 342/357.31 |
| 6,526,352 B1 * | 2/2003 | Breed | G01C 21/3697 342/357.31 |
| 7,062,305 B1 * | 6/2006 | Cameron | G01C 15/00 342/357.27 |
| 7,922,606 B2 * | 4/2011 | Balardeta | A63B 24/0021 473/407 |
| 8,070,629 B2 * | 12/2011 | Balardeta | A63B 57/00 382/113 |
| 8,135,505 B2 * | 3/2012 | Vengroff | G06Q 30/02 701/24 |
| 8,947,205 B2 * | 2/2015 | Rushing | G01C 15/04 340/10.1 |
| 9,134,426 B1 * | 9/2015 | Siris | G01S 19/07 |
| 2004/0220906 A1 * | 11/2004 | Gargi | G06Q 30/06 |
| 2005/0228585 A1 * | 10/2005 | Pickett | G01C 15/00 701/409 |
| 2006/0142943 A1 * | 6/2006 | Park | G01C 11/02 701/469 |
| 2007/0112936 A1 * | 5/2007 | Harrison | G06Q 30/02 709/217 |
| 2008/0040029 A1 * | 2/2008 | Breed | B60N 2/2863 701/514 |
| 2008/0130955 A1 * | 6/2008 | Harrison | G06F 17/30241 382/113 |
| 2009/0267838 A1 * | 10/2009 | Khushu | H04M 1/72527 342/450 |
| 2010/0056185 A1 * | 3/2010 | Lamba | G01S 5/02 455/456.6 |
| 2011/0257885 A1 * | 10/2011 | Tuck | G01C 21/30 701/472 |
| 2012/0190386 A1 * | 7/2012 | Anderson | G01C 15/04 455/456.3 |
| 2012/0218118 A1 * | 8/2012 | Weston | E21B 19/00 340/853.8 |
| 2015/0056369 A1 * | 2/2015 | Kohn | G01C 15/06 427/137 |
| 2015/0057801 A1 * | 2/2015 | Stephens, Jr. | B25J 9/1689 700/259 |
| 2017/0059328 A1 * | 3/2017 | Dousse | G01C 21/206 |

\* cited by examiner

METHOD FOR USING GEOGRAPHICAL POSITIONING SYSTEM DATA TO SKETCH THE SITE FOR SCOUTING JOB

CROSS-REFERENCE TO RELATED APPLICATIONS

This application is a U.S. National Stage patent application of International Patent Application No. PCT/US2013/066428, filed on Oct. 23, 2013, which claims priority to U.S. Provisional Patent Application No. 61/874,749, filed on Sep. 6, 2013, the benefit of both of which are claimed and the disclosure of both of which are incorporated herein by reference in their entirety.

BACKGROUND OF THE INVENTION

1. Field of the Invention

The present invention generally relates to the field of hydrocarbon recovery, and more particularly, to a system and method configured to use global positioning information to allow for drawing on a map a geometrical shape or other markers that will be used by a scouting application.

2. Discussion of the Related Art

Properly managing and optimizing drilling operations requires an information management system that can capture, track, report, and analyze all activities at the rig. OpenWells® software, available from Landmark Graphics Corporation, manages and tracks drilling and completion activities for a few wells or across your entire organization. OpenWells® software simplifies data collection and streamlines reporting and analysis. The software also offers the industry's only interactive user interface, and is integrated with Landmark's Engineer's Data Model™ database and engineering tools.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Oil/Gas scouting involves measuring, recording, and evaluating geological data to prospect for oil or gas. For the most part, the scouting job is done manually. For instance, in current operations, a user has to manually draw the site perimeter and mark site equipment on a map for enabling rig activities.

Accordingly, the disclosed embodiments include a system and method configured to use global positioning information to allow for, among other things, drawing on a map a geometrical shape that will be used by a scouting application.

The disclosed embodiments and advantages thereof are best understood by referring to FIGS. 1-8 of the drawings, which are appended at the end of this document, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiment was chosen and described to explain the principles of the invention and the practical application, and to enable others of ordinary skill in the art to understand the invention for various embodiments with various modifications as are suited to the particular use contemplated.

Figure 1:
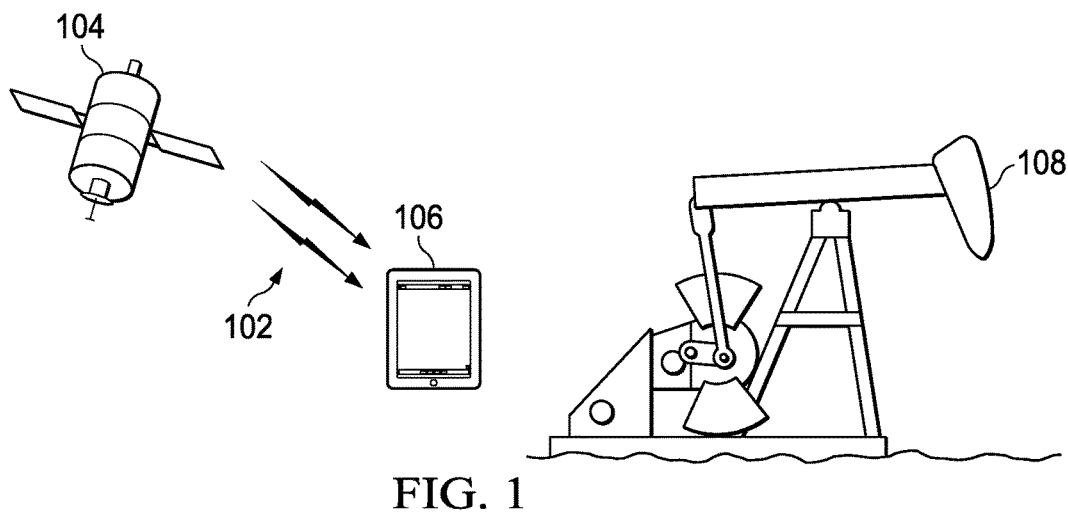
FIG. 1 is a diagram illustrating an overview of the disclosed embodiments.

Beginning with FIG. 1, a diagram 100 is presented that provides an overview of the disclosed embodiments. As depicted in FIG. 1, the disclosed embodiments utilize global positioning system (GPS) information 102 received by GPS satellites 104 to determine the location of a mobile device 106. The mobile device 106 may be any type of electronic device such as, but not limited to, a tablet, a smartphone, a laptop, or any other mobile computing device. The mobile device 106 includes one or more specially configured software/applications (herein referred to as a scouting application) that track the location information for enabling, among other things, the drawing of a drill site's perimeter or other boundaries and for marking the location of specific items such as site equipment on a map for enabling rig activities at a well site 108.

As will be further described below, in one embodiment, the scouting application is configured to automatically generate or display a map on a graphical user interface (GUI) and draw the perimeter or any other user-desired location in real time by recording location information as a user moves around the perimeter.

Figure 2:
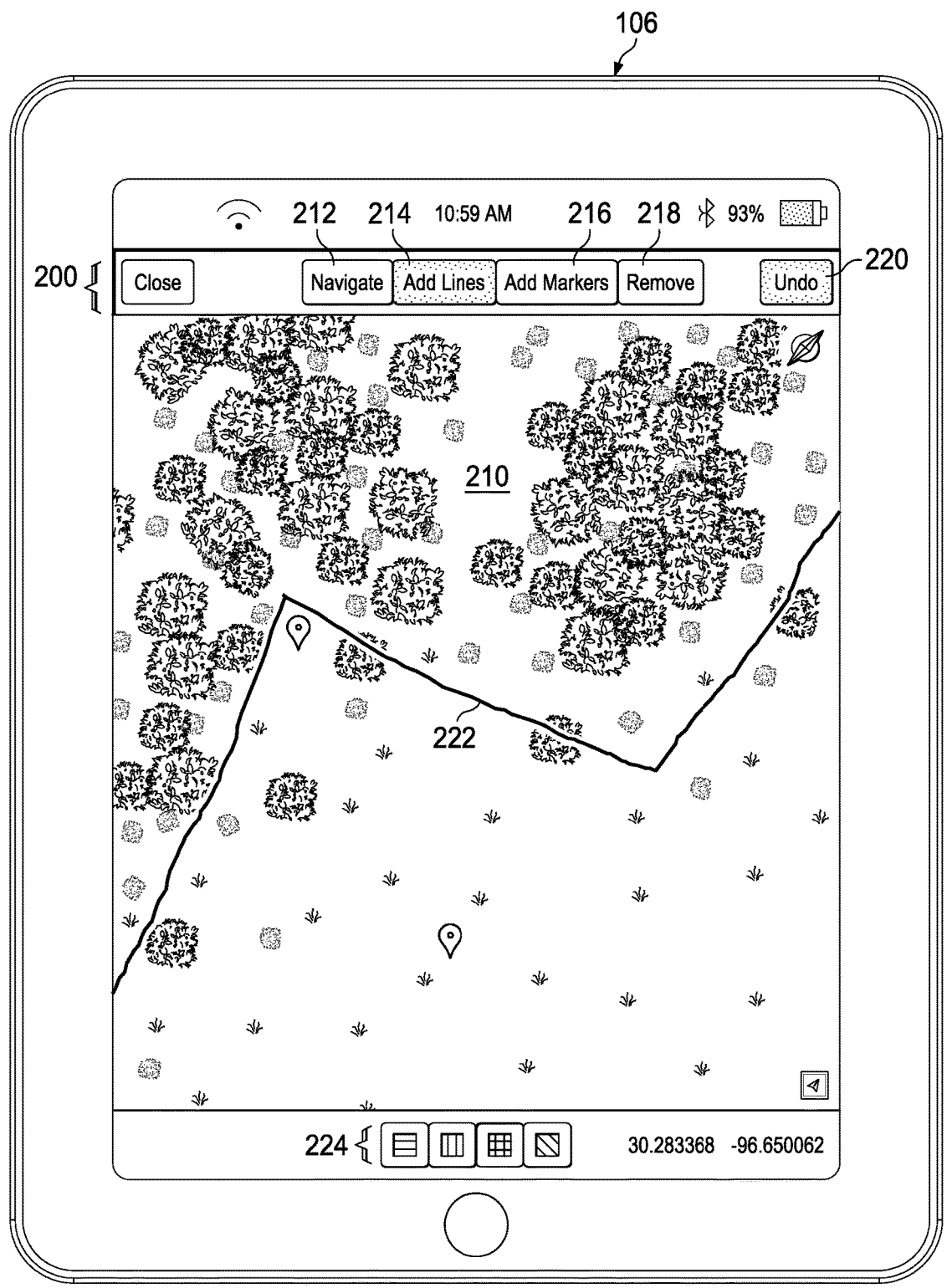
FIG. 2 is a diagram illustrating a graphical user-interface in accordance with the disclosed embodiments.

For example, FIG. 2 illustrates a diagram that depicts an embodiment in which a graphical user interface 200 is used to display a map 210 on the mobile device 106 (in this case, a tablet device). As depicted in FIG. 2, in certain embodiments, the graphical user interface 200 includes a set of user-selectable options such as, but not limited to, a navigate option 212, an add lines option 214, an add markers option 216, a remove option 218, and an undo option 220. In one embodiment, the navigate option 212 is used to provide and/or depict navigational instructions to a user. The add lines option 214 is used to add a line to the displayed map. For instance, as will be further described below, in certain embodiments, the add lines option 214 is configured to enable a manual tracking mode and automated tracking mode. In one embodiment, the manual tracking mode enables a user to manually indicate the starting and ending points of a line based on a current location of the mobile device 106. In contrast, the automated tracking mode automatically tracks the location of the mobile device 106 to draw a line on the map 210 without requiring additional user interaction. As a non-limiting example, the drawn line or lines may indicate a perimeter of a well site or an access road to the well site.

In addition, in certain embodiments, the graphical user interface 200 may also be configured to enable a user to select various colors 224 as desired to differentiate particular items on the map. For instance, an access road may be depicted in a first color, while a perimeter is depicted in a second color. In other embodiments, the scouting application may enable a user to select from a menu list, enter freehand text information, or select representative shapes/icons that identifies a particular object(s) that is/are located at a particular location point.

Still, in certain embodiments, the line may be drawn in real-time or near real-time as the user/mobile device 106 moves using the automatic tracking mode or as the user manually indicates/adds location points using the manual tracking mode. Alternatively, in certain embodiments, the line may be drawn after the user indicates an ending point (i.e., only after all points are collected). For example, in one embodiment, the user can indicate that the current location of the mobile device 106 is an ending point by stopping the automatic location tracking mode or by manually indicating an ending point in the manual tracking mode.

In one embodiment, the add markers option 216 is configured to enable a user to mark a location of a specific item or thing at the well site. For example, a user can add a marker to indicate the location of different well equipment at a well site.

The remove option 218 is configured to enable a user to remove a line or a marker. For example, in one embodiment, when the remove option 218 is selected, a user can simply touch a marker to have it removed/deleted. Similarly, in certain embodiments, the user can remove a set of connected lines, a single line, and/or even a portion of a line. The undo option 220 can also be used to undo the last action/change that was made to the map 210.

Figure 3:
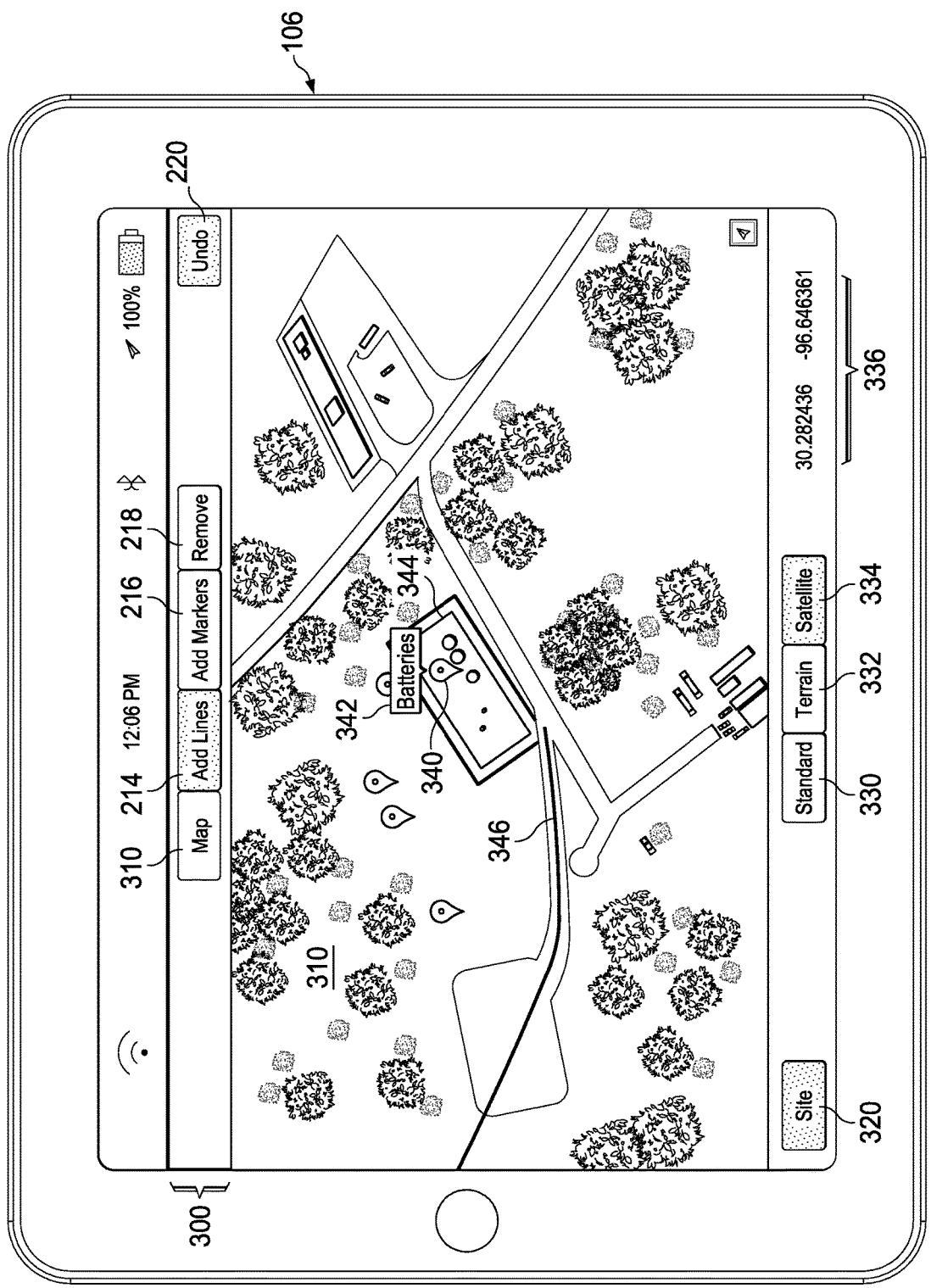
FIG. 3 is a diagram illustrating a graphical user-interface in accordance with the disclosed embodiments.

FIG. 3 is a diagram that illustrates a graphical user interface 300 on the mobile device 106 in accordance with another embodiment. As shown in FIG. 3, the graphical user interface 300 includes some similar features to that depicted in graphical user interface 200 such as, but not limited to, add lines option 214, add markers option 216, remove option 218, and undo option 220. However, in this embodiment, the graphical user interface 300 includes a map option 310. In one embodiment, the map option 310 is configured to allow the user to navigate on the map without the drawing features. For example, touch and drag on the map will allow the user to view a different location while on option 214 the same gesture will draw a line.

The graphical user interface 300 also includes a set of map display options for displaying the map 310 in different map formats. For example, in the depicted embodiment, the map 310 may be displayed in a standard format option 330, a terrain map option 332, and a satellite map option 334. In one embodiment, the standard format option 330 is configured to display a road map view, the terrain map option 332 is configured to display a physical map based on terrain information, and the satellite map option 334 is configured to display satellite images, such as images received from Google Earth®. As an example, in the depicted embodiment, a satellite image of a well site is displayed on the graphical user interface 300. Still, in certain embodiments, the graphical user interface 300 will display real-time location coordinates 336 for enabling a user to determine the precise coordinates of a particular location.

As shown in FIG. 3, using the disclosed embodiments, a user is able to travel (by foot or by vehicle) to mark a perimeter 344 of the well site or an access road 346. In addition, the scouting application may also be configured to enable the user to place specific makers, such as marker 340, to indicate one or more well equipment located at the well site. Still, as depicted in FIG. 3, in certain embodiments, the scouting application may also be configured to enable a user to type/write a description to label a particular marker 342.

In addition, in some embodiments, the scouting application may also be configured to provide a site option 320 that enables a user to switch/display a map of another well site. For instance, in one embodiment, selecting site option 320 may bring up a list of well sites that is accessible to the user. In one embodiment, the maps and corresponding data associated with other well sites may be retrieved from local memory of the mobile device 106 if they were previously stored or downloaded to the mobile device 106. If the map associated with a particular well site is not locally stored, in one embodiment, the scouting application is configured to communicate over a network to retrieve the desired map and any corresponding data. Similarly, in certain embodiments, the scouting application is configured to upload map and corresponding data of a well site to a network server or database. For instance, in some embodiments, the location information gathered by the scouting application may be stored directly into a database management system, such as, but not limited to, Landmark's Engineer's Data Model™ database.

Figure 4:
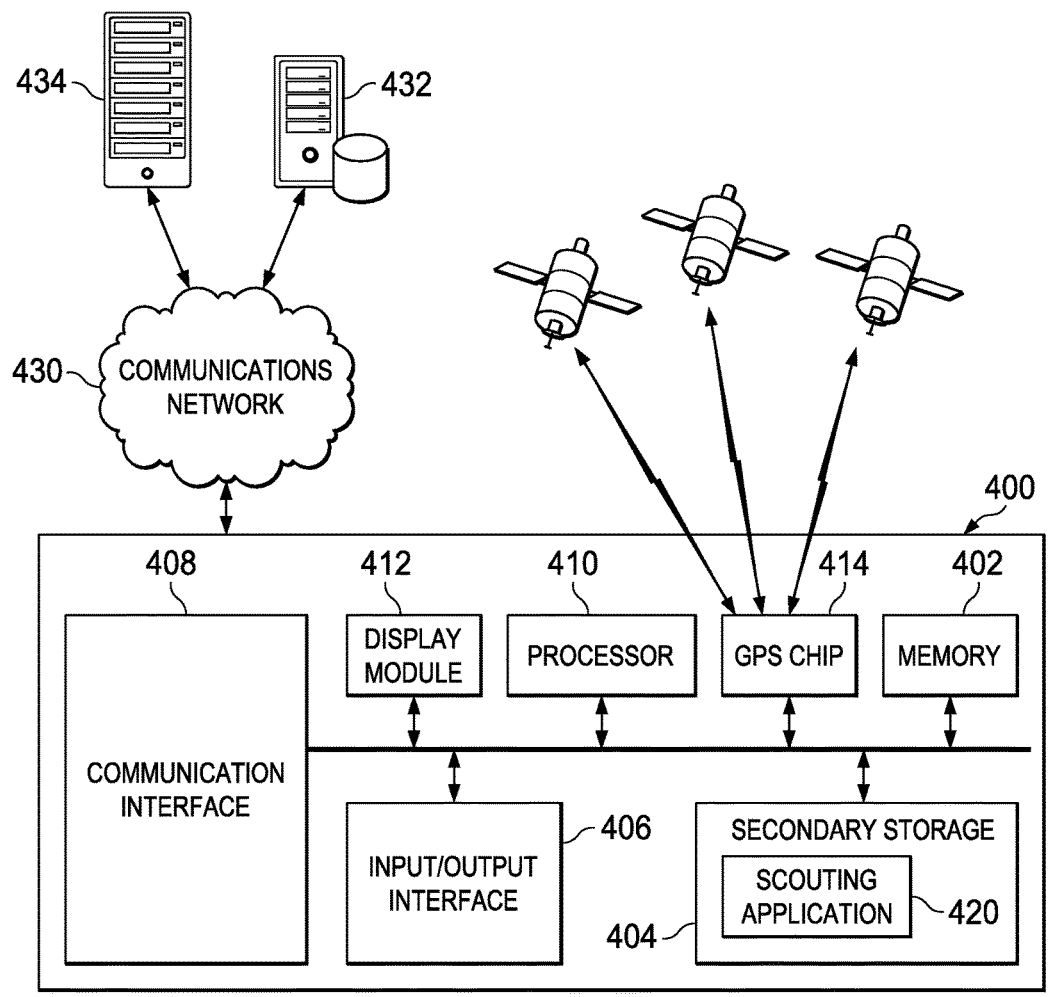
FIG. 4 is a block diagram illustrating one embodiment of a system for implementing the disclosed embodiments.

FIG. 4 is a block diagram illustrating one embodiment of a system 400 for implementing the features and functions of the disclosed embodiments. The system 400 may be any type of mobile of mobile computing device as described above. Generally, in one embodiment, the system 400 includes, among other components, a processor 400, main memory 402, secondary storage unit 404, an input/output interface module 406, a communication interface module 408, and a GPS Chip 414. The processor 400 may be any type or any number of single core or multi-core processors capable of executing instructions for performing the features and functions of the disclosed embodiments.

The input/output interface module 406 enables the system 400 to receive user input (e.g., from a keyboard and mouse) and output information to one or more devices such as, but not limited to, printers, external data storage devices, and audio speakers. The system 400 may optionally include a separate display module 410 to enable information to be displayed on an integrated or external display device. For instance, the display module 410 may include instructions or hardware (e.g., a graphics card or chip) for providing enhanced graphics, touchscreen, and/or multi-touch functionalities associated with one or more display devices.

Main memory 402 is volatile memory that stores currently executing instructions/data or instructions/data that are prefetched for execution. The secondary storage unit 404 is non-volatile memory for storing persistent data. The secondary storage unit 404 may be or include any type of data storage component such as a hard drive, a flash drive, or a memory card. In one embodiment, the secondary storage unit 404 stores the computer executable code/instructions and other relevant data for enabling a user to perform the features and functions of the disclosed embodiments.

For example, in accordance with the disclosed embodiments, the secondary storage unit 404 may permanently store the executable code/instructions of the above-described scouting application 420. The instructions associated with the scouting application 420 are then loaded from the secondary storage unit 404 to main memory 402 during execution by the processor 400 for performing the disclosed embodiments.

The GPS Chip 414 enables the system 400 to receive GPS signals from satellites high above the Earth. Each satellite continually transmits messages that include the time the message was transmitted satellite position at time of message transmission. The GPS Chip 414 uses the messages it receives to determine the transit time of each message and computes the distance to each satellite. The GPS Chip 414 uses the determined distances and the satellites' locations to compute the location of the system 400. The scouting application 420 then uses this determined location information as described herein.

Additionally, in some embodiments, the system 400 uses the communication interface module 408 to communicate with a communications network 430. For example, the network interface module 408 may include a network interface card and/or a wireless transceiver for enabling the system 400 to send and receive data through the communications network 430 and/or directly with other devices. The communications network 430 may be any type of network including a combination of one or more of the following networks: a wide area network, a local area network, one or more private networks, the Internet, a telephone network such as the public switched telephone network (PSTN), one or more cellular networks, and wireless data networks. The communications network 430 may include a plurality of network nodes (not depicted) such as routers, network access points/gateways, switches, DNS servers, proxy servers, and other network nodes for assisting in routing of data/communications between devices.

As described above, in some embodiments, the system 400 may interact with one or more servers 434 or databases 432 (e.g., Landmark's Engineer's Data Model™ database) for performing the features of the present invention. For instance, the system 400 may query the database 432 to retrieve mapping information in accordance with the disclosed embodiments.

Figure 5:
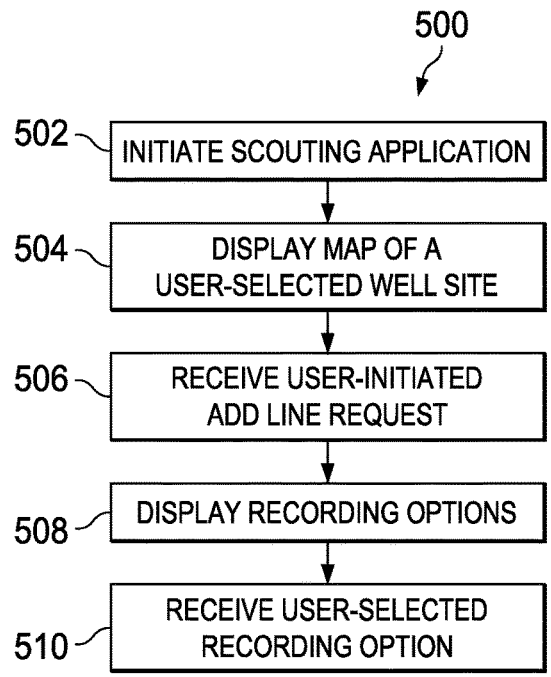
FIG. 5 is a flowchart illustrating an example of a computer implemented method for initiating a process for adding of a new line in accordance with the disclosed embodiments.

FIG. 5 illustrates a flowchart depicting a process 500 for adding a line (e.g., for drawing a well site's perimeter, access road, or other user-desired location) in accordance with the disclosed embodiments. As shown, in one embodiment, the process 500 begins by initiating the scouting application at step 502. Once the scouting application is initiated, the process, at step 504 displays a map of a user-selected well site. In one embodiment, the scouting application is configured as a default to display the map corresponding to a well site that was last displayed by the scouting application.

In the depicted embodiment, the process at step 506 receives a user-initiated add line request. In one embodiment, the process at step 508 presents/displays recording options to the user. For example, in one embodiment, the user can select between 1) a manual recording option in which the user manually designates/indicates a desired location (e.g., the user can manually indicate the four corners of a rectangular shaped perimeter of a well site) and 2) an automated recording option in which the location of the mobile device is automatically tracked for adding the user-desired line. At step 510, the process receives a user-selected recording option. As an alternative, in certain embodiments, the scouting application may be pre-configured with a set of parameters (user-settings) that may include an option to enable a user to specify a default recording option, in which case, the process 500 would not include steps 508 and 510.

As previously stated, in certain embodiments, the process may draw portions of the new line as the user moves (in the automated mode) or as additional points are manually designated by the user (in the manual mode). Alternatively, in certain embodiments, the process may wait until all points or location data are received to draw the new line.

Figure 6:
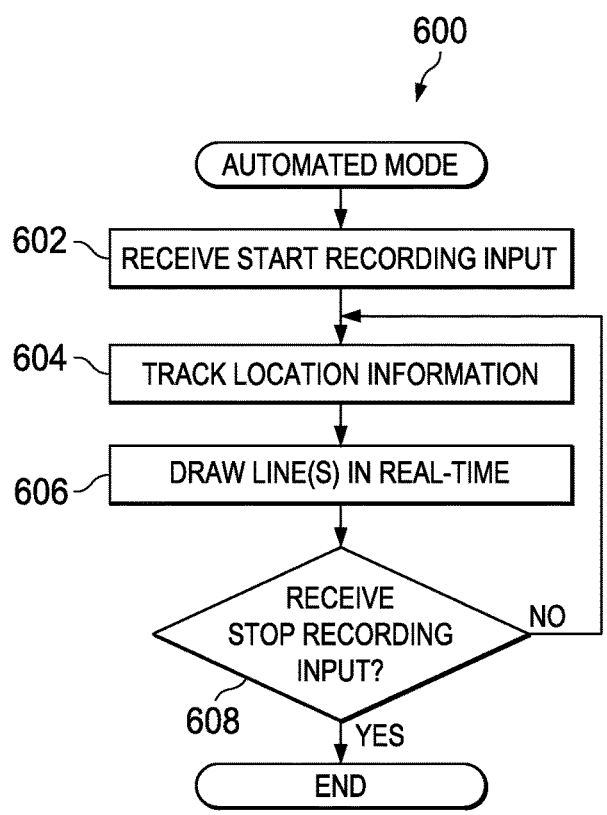
FIG. 6 is a flowchart illustrating an example of a computer implemented method for adding a new line using an automated mode in accordance with the disclosed embodiments.

As an example, FIG. 6 is a flow chart that depicts a process 600 for adding a line in using an automated mode in accordance with the disclosed embodiments. Process 600 begins by receiving a start recording user-input request at step 602. The process at step 604 begins recording/tracking the location information associated with the location of the mobile device. In the depicted embodiment, the process 600 draws the new line in real-time as the mobile device moves at step 606. The process continues to record the location information of the mobile device and the drawing of the new line until a stop recording user-input request is received at step 608.

Figure 7:
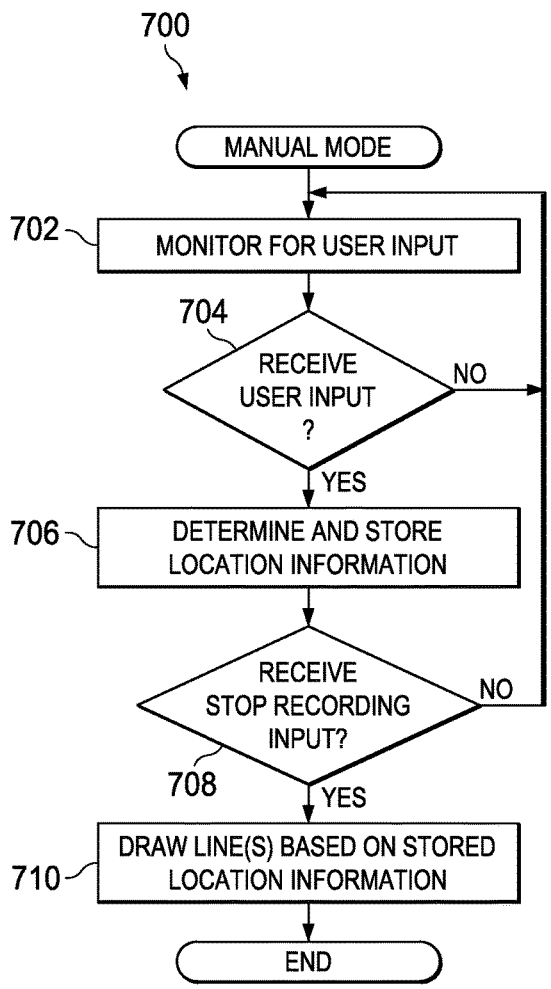
FIG. 7 is a flowchart illustrating an example of a computer implemented method for adding a new line using a manual tracking mode in accordance with the disclosed embodiments.

FIG. 7 is a flow chart that depicts an example of a process 700 for adding a line in using a manual tracking mode in accordance with the disclosed embodiments. In the depicted embodiment, once the manual recording mode is initiated, the process at step 702 monitors/waits for user-input indicating a user-desired location (e.g., a user can indicate a starting point of an access road). Once the user-input indicating a user-desired location is received at step 704, the process at step 706, determines and stores the location data associated with the user-desired location. The process repeats steps 702-706 until a stop recording user-input request is received at step 708. In this embodiment, once the stop recording user-input request is received, the process at step 710 draws/adds the new line(s) to the map based on the stored location information. In an alternative embodiment, the process 700 may be configured to draw/add portions of the new line as new location points are manually indicated by the user.

Additionally, although not depicted in FIGS. 6 and 7, the disclosed embodiments may also be configured to enable the user to label a new line. For example, in one embodiment, once a new line is added, the processes may be configured to display a text input box for enabling a user to add a description associated with the new line.

Figure 8:
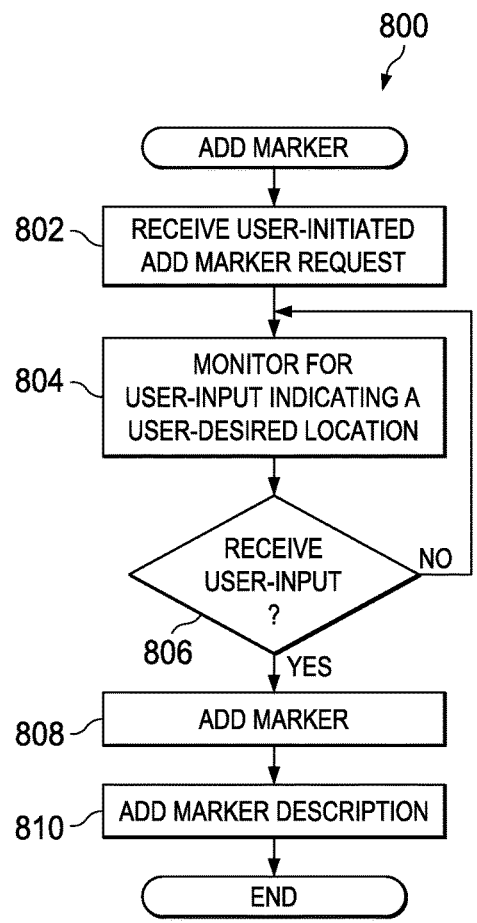
FIG. 8 is a flowchart illustrating an example of a computer implemented method for adding a marker in accordance with the disclosed embodiments.

FIG. 8 is a flow chart that depicts an example of a process 800 for adding a marker in accordance with the disclosed embodiments. At step 802, the process receives a user-initiated add marker request. At step 804, the process monitors/waits for user-input indicating a user-desired location (e.g., a user can indicate a location of a well equipment). Once the user-input indicating a user-desired location is received at step 806, the process at step 808 adds a marker to the map at the user-desired location. The process at step 810 displays a text input box for enabling a user to add a description associated with the new marker.

As an alternative embodiment, the scouting application may be configured to enable a user to drag and drop markers or specific icons (e.g., an icon representing a particular piece of equipment) onto a location on the map. Alternatively, in one embodiment, the process may be configured to enable a user to select a particular icon/marker and have it automatically placed at a user's/the mobile device's current location.

While specific details about the above embodiments have been described, the above hardware and software descriptions are intended merely as example embodiments and are not intended to limit the structure or implementation of the disclosed embodiments. For instance, although many other internal components of the system 400 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Accordingly, the disclosed embodiments include a system and method configured to use global positioning information to allow for, among other things, drawing on a map a geometrical shape indicative of a perimeter of drill site, marking site equipment, and marking access roads as part of a scouting application for enabling rig activities. Advantages of the disclosed embodiments include automatically recording and labeling the locations for future equipment and roads, eliminating the need to manually use an external survey device and then draw the perimeter and location of each component on the rig, and enables integration with Openwells Mobile for directly storing data in EDM. Each of the above advantages reduces potential errors and saves time. Additionally, the disclosed embodiments enable convenient and fast view and editing of scouting data.

In addition to the embodiments described above, many examples of specific combinations are within the scope of the disclosure, some of which are detailed in the below.

Example One. A system comprising at least one processor; a global positioning system unit configured to receive satellite signals; and at least one memory coupled to the at least one processor and storing instructions that when executed by the at least one processor performs operations comprising determining location data based on the satellite signals; and indicating a location of interest associated with a well site on a map based on the location data.

Example Two. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; determining location data based on the satellite signals; and indicating a location of interest associated with a well site on a map based on the location data.

Example Three. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; and indicating a location of interest associated with a well site on a map based on the location data.

Example Four. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point.

Example Five. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to the user-input indicating the manual location tracking option, determining location data based on the satellite signals only in response to receiving a user-initiated input to mark a location.

Example Six. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; wherein responsive to the user-input indicating the manual location tracking option, determining location data based on the satellite signals only in response to receiving a user-initiated input to mark a location; and connecting a plurality of user-initiated marked locations to indicate the location of interest.

Example Seven. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point; wherein the location of interest is a perimeter of the well site.

Example Eight. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; wherein responsive to the user-input indicating the manual location tracking option, determining location data based on the satellite signals only in response to receiving a user-initiated input to mark a location; and connecting a plurality of user-initiated marked locations to indicate the location of interest, wherein the location of interest is a perimeter of the well site.

Example Nine. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point; wherein the location of interest is an access road to the well site.

Example Ten. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; wherein responsive to the user-input indicating the manual location tracking option, determining location data based on the satellite signals only in response to receiving a user-initiated input to mark a location; and connecting a plurality of user-initiated marked locations to indicate the location of interest, wherein the location of interest is an access road to the well site.

Example Eleven. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point; wherein the location of interest is drawn on the map as the intermediate points are identified.

Example Twelve. A system comprising at least one processor; a global positioning system unit configured to receive satellite signals; and at least one memory coupled to the at least one processor and storing instructions that when executed by the at least one processor performs operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data, wherein the location of interest is a location of an equipment at the well site; and wherein responsive to the user-input indicating the manual location tracking option, determining location data based on the satellite signals only in response to receiving a user-initiated input to mark a location.

Example Thirteen. A system comprising at least one processor; a global positioning system unit configured to receive satellite signals; and at least one memory coupled to the at least one processor and storing instructions that when executed by the at least one processor performs operations comprising determining location data based on the satellite signals; indicating a location of interest associated with a well site on a map based on the location data; and displaying the map in a user-selected format option, the user-selected format option selected from a map format option group comprising a standard map, a terrain map, and a satellite map.

Example Fourteen. A system comprising at least one processor; a global positioning system unit configured to receive satellite signals; and at least one memory coupled to the at least one processor and storing instructions that when executed by the at least one processor performs operations comprising determining location data based on the satellite signals; indicating a location of interest associated with a well site on a map based on the location data; and displaying different types of locations of interest using different colors.

Example Fifteen. A system comprising at least one processor; a global positioning system unit configured to receive satellite signals; and at least one memory coupled to the at least one processor and storing instructions that when executed by the at least one processor performs operations comprising determining location data based on the satellite signals; indicating a location of interest associated with a well site on a map based on the location data; and displaying longitudinal and latitudinal coordinates of the location data while displaying the map.

Example Sixteen. A system comprising at least one processor; a global positioning system unit configured to receive satellite signals; and at least one memory coupled to the at least one processor and storing instructions that when executed by the at least one processor performs operations comprising determining location data based on the satellite signals; indicating a location of interest associated with a well site on a map based on the location data; and receiving user-input that describes the location of interest and labeling the location of interest on the map using on the user-input.

Example Seventeen. A non-transitory computer readable medium comprising computer executable instructions for identifying locations associated with a well site, the computer executable instructions when executed causes one or more machines to perform operations comprising receiving satellite signals; determining location data based on the satellite signals; and indicating a location of interest associated with the well site on a map based on the location data.

Example Eighteen. A non-transitory computer readable medium comprising computer executable instructions for identifying locations associated with a well site, the computer executable instructions when executed causes one or more machines to perform operations comprising receiving satellite signals; determining location data based on the satellite signals; indicating a location of interest associated with the well site on a map based on the location data; initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point.

Example Nineteen. A non-transitory computer readable medium comprising computer executable instructions for identifying locations associated with a well site, the computer executable instructions when executed causes one or more machines to perform operations comprising receiving satellite signals; determining location data based on the satellite signals only in response to receiving a user-initiated input to mark a location; indicating a location of interest associated with the well site on a map based on the location data.

Example Twenty. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; determining location data based on the satellite signals; and indicating a location of interest associated with a well site on a map based on the location data.

Example Twenty-One. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; and indicating a location of interest associated with a well site on a map based on the location data.

Example Twenty-Two. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point.

Example Twenty-Three. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to the user-input indicating the manual location tracking option, determining location data based on the satellite signals only in response to receiving a user-initiated input to mark a location.

Example Twenty-Four. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; wherein responsive to the user-input indicating the manual location tracking option, determining location data based on the satellite signals only in response to receiving a user-initiated input to mark a location; and connecting a plurality of user-initiated marked locations to indicate the location of interest.

Example Twenty-Five. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point; wherein the location of interest is a perimeter of the well site.

Example Twenty-Six. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; wherein responsive to the user-input indicating the manual location tracking option, determining location data based on the satellite signals only in response to receiving a user-initiated input to mark a location; and connecting a plurality of user-initiated marked locations to indicate the location of interest, wherein the location of interest is a perimeter of the well site.

Example Twenty-Seven. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point; wherein the location of interest is an access road to the well site.

Example Twenty-Eight. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; wherein responsive to the user-input indicating the manual location tracking option, determining location data based on the satellite signals only in response to receiving a user-initiated input to mark a location; and connecting a plurality of user-initiated marked locations to indicate the location of interest, wherein the location of interest is an access road to the well site.

Example Twenty-Nine. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point; wherein the location of interest is drawn on the map as the intermediate points are identified.

Example Thirty. A non-transitory computer readable medium comprising computer executable instructions for identifying locations associated with a well site, the computer executable instructions when executed causes one or more machines to perform operations comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data, wherein the location of interest is a location of an equipment at the well site; and wherein responsive to the user-input indicating the manual location tracking option, determining location data based on the satellite signals only in response to receiving a user-initiated input to mark a location.

Example Thirty-One. A non-transitory computer readable medium comprising computer executable instructions for identifying locations associated with a well site, the computer executable instructions when executed causes one or more machines to perform operations comprising determining location data based on the satellite signals; indicating a location of interest associated with a well site on a map based on the location data; and displaying the map in a user-selected format option, the user-selected format option selected from a map format option group comprising a standard map, a terrain map, and a satellite map.

Example Thirty-Two. A non-transitory computer readable medium comprising computer executable instructions for identifying locations associated with a well site, the computer executable instructions when executed causes one or more machines to perform operations comprising determining location data based on the satellite signals; indicating a location of interest associated with a well site on a map based on the location data; and displaying different types of locations of interest using different colors.

Example Fifteen. A non-transitory computer readable medium comprising computer executable instructions for identifying locations associated with a well site, the computer executable instructions when executed causes one or more machines to perform operations comprising determining location data based on the satellite signals; indicating a location of interest associated with a well site on a map based on the location data; and displaying longitudinal and latitudinal coordinates of the location data while displaying the map.

Example Thirty-Three. A non-transitory computer readable medium comprising computer executable instructions for identifying locations associated with a well site, the computer executable instructions when executed causes one or more machines to perform operations comprising determining location data based on the satellite signals; indicating a location of interest associated with a well site on a map based on the location data; receiving user-input that describes the location of interest; and labeling the location of interest on the map using on the user-input.

Example Thirty-Four. A computer-implemented method for identifying locations associated with a well site, the method comprising receiving satellite signals; determining location data based on the satellite signals; and indicating a location of interest associated with the well site on a map based on the location data.

Example Thirty-Five. A computer-implemented method for identifying locations associated with a well site, the method comprising receiving satellite signals; determining location data based on the satellite signals; indicating a location of interest associated with the well site on a map based on the location data; initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point.

Example Thirty-Six. A computer-implemented method for identifying locations associated with a well site, the method comprising receiving satellite signals; determining location data based on the satellite signals only in response to receiving a user-initiated input to mark a location; indicating a location of interest associated with the well site on a map based on the location data.

Example Thirty-Seven. A computer-implemented method for identifying locations associated with a well site, the method comprising receiving a user-input that indicates a marking option, the marking option selected from a marking option group comprising of add lines, add markers, and remove one of lines and markers on the map; determining location data based on the satellite signals; and indicating a location of interest associated with a well site on a map based on the location data.

Example Thirty-Eight. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; and indicating a location of interest associated with a well site on a map based on the location data.

Example Thirty-Nine. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point.

Example Forty. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to the user-input indicating the manual location tracking option, determining location data based on the satellite signals only in response to receiving a user-initiated input to mark a location.

Example Forty-One. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; wherein responsive to the user-input indicating the manual location tracking option, determining location data based on the satellite signals only in response to receiving a user-initiated input to mark a location; and connecting a plurality of user-initiated marked locations to indicate the location of interest.

Example Forty-Two. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point; wherein the location of interest is a perimeter of the well site.

Example Forty-Three. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; wherein responsive to the user-input indicating the manual location tracking option, determining location data based on the satellite signals only in response to receiving a user-initiated input to mark a location; and connecting a plurality of user-initiated marked locations to indicate the location of interest, wherein the location of interest is a perimeter of the well site.

Example Forty-Four. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point; wherein the location of interest is an access road to the well site.

Example Forty-Five. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; wherein responsive to the user-input indicating the manual location tracking option, determining location data based on the satellite signals only in response to receiving a user-initiated input to mark a location; and connecting a plurality of user-initiated marked locations to indicate the location of interest, wherein the location of interest is an access road to the well site.

Example Forty-Six. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data; and wherein responsive to receiving a user-input indicating the automatic location tracking option, the operations further comprise initiating the determining location data based on the satellite signals in response to receiving a user-initiated start input to identify a starting location; determining location data based on the satellite signals to identify intermediate points until receiving a user-initiated stop input; identifying an end point in response to receiving the user-initiated stop input; and determining the location of interest associated with the well site based on the starting point, the intermediate points, and the end point; wherein the location of interest is drawn on the map as the intermediate points are identified.

Example Forty-Seven. A computer-implemented method for identifying locations associated with a well site, the method comprising receiving a user-input that indicates a marking option, the marking option selected from a marking option group comprising of add lines, add markers, and remove one of lines and markers on the map; displaying recording options to a user in response to receiving the marking option of add lines, the recording options consisting of a manual location tracking option and an automatic location tracking option; determining location data based on the satellite signals; indicating a location of interest associated with a well site on a map based on the location data, wherein the location of interest is a location of an equipment at the well site; and wherein responsive to the user-input indicating the manual location tracking option, determining location data based on the satellite signals only in response to receiving a user-initiated input to mark a location.

Example Forty-Eight. A computer-implemented method for identifying locations associated with a well site, the method comprising determining location data based on the satellite signals; indicating a location of interest associated with a well site on a map based on the location data; and displaying the map in a user-selected format option, the user-selected format option selected from a map format option group comprising a standard map, a terrain map, and a satellite map.

Example Forty-Nine. A computer-implemented method for identifying locations associated with a well site, the method comprising determining location data based on the satellite signals; indicating a location of interest associated with a well site on a map based on the location data; and displaying different types of locations of interest using different colors.

Example Fifty. A computer-implemented method for identifying locations associated with a well site, the method comprising determining location data based on the satellite signals; indicating a location of interest associated with a well site on a map based on the location data; and displaying longitudinal and latitudinal coordinates of the location data while displaying the map.

Example Fifty-One. A computer-implemented method for identifying locations associated with a well site, the method comprising determining location data based on the satellite signals; indicating a location of interest associated with a well site on a map based on the location data; receiving user-input that describes the location of interest; and labeling the location of interest on the map using on the user-input.

While many specific example embodiments are described above, the above examples are not intended to be exhaustive or limit the invention in the form disclosed. Many modifications and variations will be apparent to those of ordinary skill in the art without departing from the scope and spirit of the invention. The scope of the claims is intended to broadly cover the disclosed embodiments and any such modification.

The invention claimed is:
1. A system comprising:
at least one processor;
a global positioning system to receive satellite signals;
a display device; and at least one memory coupled to the at least one processor and storing instructions that when executed by the at least one processor performs a plurality of functions, including functions to:
 determine location data for a mobile device of a user at a well site based on the satellite signals received by the global positioning system;
 track the location data of the mobile device as the user moves from a starting point to an ending point at the well site;
 identify a location of interest at the well site based on the tracking; and
 provide an indication of the identified location of interest on a map of the well site as displayed via a graphical user interface on the display device.

2. The system of claim 1, wherein the location of the mobile device is tracked in response to user-input that indicates a marking option for the location of interest on the map, and the marking option is selected from the group consisting of: an add lines option; an add markers option; a remove lines option; and a remove markers option.

3. The system of claim 2, wherein the functions performed by the processor further include functions to:
 display recording options to the user via the graphical user interface on the display device in response to receiving the add lines option as the selected marking option, the recording options including a manual recording option for a manual location tracking mode and an automated recording option for an automatic location tracking mode.

4. The system of claim 3, wherein the functions performed by the processor further include functions to:
 receive, via the graphical user interface, input from the user selecting the automated recording option to initiate the automatic location tracking mode;
 identify the starting point as a current location of the user's mobile device, based on the satellite signals received by the global positioning system when the input for the user-initiated automatic location tracking mode is received;
 identify intermediate points based on the location data that is tracked as the user moves from the starting point toward the ending point;
 receive additional input from the user for stopping the automatic locating tracking mode;
 identify the ending point as the current location of the user's mobile device, based on the satellite signals received by the global positioning system when the additional input is received from the user; and
 determine the location of interest associated with the well site based on the starting point, the intermediate points, and the ending point.

5. The system of claim 3, wherein the functions performed by the processor further include functions to:
 receive input from the user selecting the manual recording option to initiate the manual location tracking mode, the manual location tracking mode enabling the user to manually indicate a current location of the user's mobile device as at least one of the starting point, the ending point, or an intermediate point between the starting and ending points.

6. The system of claim 5, wherein the manual location tracking model further enables the user to indicate the current location of the mobile device as a location of interest at the well site, and the location of interest is displayed on the map via the graphical user interface on the display device.

7. The system of claim 1, wherein the location of interest is a perimeter of the well site.

8. The system of claim 1, wherein the location of interest is an access road to the well site.

9. The system of claim 4, wherein one or more lines indicating the location of interest are drawn on the map as the intermediate points are identified.

10. The system of claim 1, wherein the location of interest is a location of equipment at the well site.

11. The system of claim 1, wherein the functions performed by the processor further include functions to:
 display the map via the graphical user interface on the display device in a user-selected format option, the user-selected format option including at least one of a standard map option, a terrain map option, or a satellite map option.

12. The system of claim 1, wherein different types of locations of interest are displayed on the map using different colors.

13. The system of claim 1, wherein the location of interest is displayed with longitudinal and latitudinal coordinates on the map.

14. The system of claim 1, wherein the location of interest is displayed on the map with text information entered by the user via the graphical user interface.

15. A non-transitory computer readable medium comprising computer executable instructions for identifying locations associated with a well site, the computer executable instructions when executed causes one or more machines to perform a plurality of functions, including functions to:
 receive satellite signals;
 determine location data for a mobile device of a user at a well site based on the satellite signals;
 track the location data of the mobile device as the user moves from a starting point to an ending point at the well site;
 identify a location of interest at the well site based on the tracking; and
 provide an indication of the identified location of interest on a map of the well site displayed on a display device coupled to the mobile device.

16. The non-transitory computer readable medium of claim 15, wherein the functions performed by the one or more machines further include functions to:
 receive input from the user selecting the automated recording option to initiate the automatic location tracking mode;
 identify the starting point as a current location of the user's mobile device, based on the satellite signals received when the input for the user-initiated automatic location tracking mode is received;
 identify intermediate points based on the location data that is tracked as the user moves from the starting point toward the ending point;
 receive additional input from the user for stopping the automatic locating tracking mode;
 identify the ending point as the current location of the user's mobile device, based on the satellite signals received when the additional input is received from the user; and
 determine the location of interest at the well site based on the starting point, the intermediate points, and the ending point.

17. The non-transitory computer readable medium of claim 15, wherein the functions performed by the one or more machines further include functions to:

receive input from the user to mark a location of an object at the well site; and identify a current location of the user's mobile device as the location of the object, based on the satellite signals received when the input to mark the location of the object is received.

18. A computer-implemented method for identifying locations associated with a well site, the method comprising:

receiving, by a global positioning system, satellite signals;

determining location data for a mobile device of a user at the well site based on the satellite signals;

tracking the location data of the mobile device as the user moves from a starting point to an ending point at the well site;

identifying a location of interest at the well site based on the tracking; and providing an indication of the identified location of interest on a map of the well site displayed on a display device coupled to the mobile device.

19. The computer-implemented method of claim 18, further comprising:

receiving input from the user selecting the automated recording option to initiate the automatic location tracking mode;

identifying the starting point as a current location of the user's mobile device, based on the satellite signals received when the input for the user-initiated automatic location tracking mode is received;

identifying intermediate points based on the location data that is tracked as the user moves from the starting point toward the ending point;

receiving additional input from the user for stopping the automatic locating tracking mode;

identifying the ending point as the current location of the user's mobile device, based on the satellite signals received when the additional input is received from the user; and determining the location of interest at the well site based on the starting point, the intermediate points, and the ending point.

20. The computer-implemented method of claim 18, further comprising:

receiving input from the user to mark a location of an object at the well site; and identifying a current location of the user's mobile device as the location of the object, based on the satellite signals received when the input to mark the location of the object is received.

\* \* \* \* \*